(12) United States Patent
Masuyama

(10) Patent No.: US 10,005,053 B2
(45) Date of Patent: Jun. 26, 2018

(54) PARTICLE PACKING APPARATUS

(71) Applicant: KASHIMA ENGINEERING CO., LTD., Yokohama-shi (JP)

(72) Inventor: Hideki Masuyama, Yokohama (JP)

(73) Assignee: KASHIMA ENGINEERING CO., LTD., Yokohama-shi (JP)

( * ) Notice: Subject to any disclaimer, the term of this patent is extended or adjusted under 35 U.S.C. 154(b) by 0 days. days.

(21) Appl. No.: 15/533,396

(22) PCT Filed: Apr. 25, 2016

(86) PCT No.: PCT/JP2016/062895
§ 371 (c)(1),
(2) Date: Jun. 6, 2017

(87) PCT Pub. No.: WO2016/181810
PCT Pub. Date: Nov. 17, 2016

(65) Prior Publication Data
US 2017/0326519 A1    Nov. 16, 2017

(30) Foreign Application Priority Data

May 12, 2015  (JP) ................................ 2015-097232

(51) Int. Cl.
| | | |
|---|---|---|
| *B65B 1/20* | (2006.01) | |
| *B01J 4/00* | (2006.01) | |
| *B01J 8/00* | (2006.01) | |
| *B65B 1/10* | (2006.01) | |
| *B65B 65/02* | (2006.01) | |
| *B65G 65/32* | (2006.01) | |
| *B65G 65/48* | (2006.01) | |

(52) U.S. Cl.
CPC ............... *B01J 4/007* (2013.01); *B01J 8/002* (2013.01); *B65B 1/10* (2013.01); *B65B 65/02* (2013.01); *B65G 65/32* (2013.01); *B65G 65/4872* (2013.01); *B65G 2201/042* (2013.01); *B65G 2814/0205* (2013.01); *B65G 2814/0288* (2013.01)

(58) Field of Classification Search
CPC ....... B01J 4/007; B01J 8/002; B65G 65/4872; B65G 65/32; B65G 2814/0288; B65G 2201/042; B65G 2814/0205; B65B 65/02; B65B 1/10
See application file for complete search history.

(56) References Cited

U.S. PATENT DOCUMENTS 5,731,994 A    3/1998   Okubo

FOREIGN PATENT DOCUMENTS

| JP | S61-147143 U | 9/1986 |
|---|---|---|
| JP | H06-44987 A | 6/1994 |
| JP | H08-282856 A | 10/1996 |
| JP | H10-231026 A | 9/1998 |
| JP | 3133672 B2 | 2/2001 |
| JP | 2001-163301 A1 | 6/2001 |

OTHER PUBLICATIONS

International Search Report for International Application No. PCT/JP2016/062895 dated Jul. 19, 2016 (4 Sheets translation, 4 sheets, 8 Sheets total).
PCT/JP2016/062895: English translation of the Written Opinion, dated Jul. 19, 2016.

*Primary Examiner* — Jason K Niesz
(74) *Attorney, Agent, or Firm* — Kratz, Quintos & Hanson, LLP

(57) ABSTRACT

The present invention provides a particle packing apparatus which can pack uniformly particles of catalyst, etc. without breaking the particles. The particle packing apparatus for packing particles into a vessel, comprises: a base held at a fixed position with respect to the vessel; a distributor which is rotational symmetrical to a central axis extended vertically and distributes the particles; a bearing fixed to the base and holding the distributor rotatably; a particle supplying unit fixed to the base, being rotational symmetrical to the central axis, having a bottom opening being smaller than an inner diameter of the bearing and supplying the particles to the distributor through the bottom opening; and a motor rotating the distributor.

18 Claims, 8 Drawing Sheets ical reactions. For example, in the petroleum
PARTICLE PACKING APPARATUS

TECHNICAL FIELD

The present invention relates to a particle packing apparatus for spraying and packing particles, such as catalysts, grains, feeds, etc. in a vessel, such as a reaction vessel, a storage silo, etc.

BACKGROUND ART

It is usually required that particles are uniformly packed to a vessel, such as a reaction vessel, a storage silo, etc. Catalysts are used for the composition and decomposition in various chem industry, particulate solid catalysts are used in the reaction of decomposing heavy gas oil as the raw material into gasoline with high octane numbers by the use of a catalyst, in the reaction of causing desulfurization and decomposition simultaneously by the use of a catalyst in the presence of hydrogen, etc. In such reactions, catalysts are packed in the reaction vessel, and it is known that the packed state of the catalysts influences the efficiency of the operations.

As a packing apparatus for packing catalysts, a Densi Cat system packing apparatus, an UOP system packing apparatus and a COP system packing apparatus are conventionally known. In the Densi Cat system packing apparatus, a plurality of rubber blades are used to spray particles uniformly in omni-direction based on an opening of the blades and diffusion by the blades. In the UOP system packing apparatus, particles are sprayed by using the centrifugal force of 2 to 4 straight blades. In the COP system packing apparatus, 1 to 3 layer blades having guides on elliptical plates are used to spray particles (refer to FIGS. 12 to 14 of Patent Reference 1).

As a conventional packing apparatus, for example, a packing apparatus including catalyst distribution sections each having at least 2 distribution plates arranged parallel with each other below a catalyst supply pipe, the distribution plates being coaxially rotated, the upper plate having a larger diameter than the lower plate, each plate having the surface partitioned with a plurality of ribs so as to expand radially outward, the catalyst distribution sections having radially lengths different from each other; and a catalyst dropping section having a central cylinder passed through the center of the upper distribution plate to the proximity of the lower distribution plate, and an elliptic hole passed through the upper and the lower sides of the lowermost distribution plate and extended radially from the center is known (refer to Patent Reference 2).

PRIOR ART REFERENCES

Patent References

Patent Reference 1: Japanese Patent No. 3133672.
Patent Reference 2: Published Specification of Japanese Patent Publication No. H06-44987.

SUMMARY OF THE INVENTION

Problems to be Solved by the Invention

However, the conventional particle packing apparatus have a risk that particles of catalysts, etc. would be broken. When the particles are broken, there is a risk that increases of the pressure difference of the catalyst layers and drift current of the reactant fluids would be caused, and besides, changes of a particle size distribution of the particles makes an intended packing impossible.

An object of the present invention is to provide a particle packing apparatus which can uniformly pack particles of catalysts, etc. without breaking the particles.

Means for Solving the Problem

The particle packing apparatus according to one embodiment of the present invention is characterized in that the particle packing apparatus for packing particles into a vessel, comprises: a base held at a fixed position with respect to the vessel; a distributor which is rotational symmetrical to a central axis extended vertically and distributes the particles; a bearing fixed to the base and holding the distributor rotatably; a particle supplying unit fixed to the base, being rotational symmetrical to the central axis, having a bottom opening being smaller than an inner diameter of the bearing and supplying the particles to the distributor through the bottom opening; and a motor rotating the distributor.

The particle packing apparatus according to one embodiment of the present invention is characterized in that the particle packing apparatus for packing particles into a vessel, comprises: a particle supplying unit vertically extended, the particle supplying unit having a top opening provided in the top and a bottom opening provided in the bottom, and a shutter mechanism provided in the middle for shutting the supplying of the particles, the shutter mechanism including: a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

Effects of the Invention

As described above, according to the present invention, the particle packing apparatus comprises: a base held at a fixed position with respect to the vessel; a distributor which is rotational symmetrical to a central axis extended vertically and distributes the particles; a bearing fixed to the base and holding the distributor rotatably; a particle supplying unit fixed to the base, being rotational symmetrical to the central axis, having a bottom opening being smaller than an inner diameter of the bearing and supplying the particles to the distributor through the bottom opening; and a motor rotating the distributor, whereby particles of catalysts, etc. can be packed uniformly without breaking the particles.

As described above, according to the present invention, the particle packing apparatus comprises: a particle supplying unit vertically extended, the particle supplying unit having a top opening provided in the top and a bottom opening provided in the bottom, and a shutter mechanism provided in the middle for shutting the supplying of the particles, the shutter mechanism including: a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles, whereby particles of catalysts, etc. can be packed without breaking the particles.

MODE FOR CARRYING OUT THE INVENTION

The inventor of the present invention has earnestly investigated the breakage of particles of catalysts, etc. in the conventional particle packing apparatus and has got the idea of the present invention by noticing that the particles of catalysts, etc. are broken by the presence of the rotary plates for spraying the particles and their rotation shaft in the supply path of the particles of catalyst, etc. and by being disuniformly pressurized because of curves of the packing path of the particles of catalysts, etc., and that the particles of catalysts, etc. are broken by the shutter mechanism provided in the supply path of the particles of catalyst, etc. for shutting the supply of the particles.

One Embodiment

Figure 1:
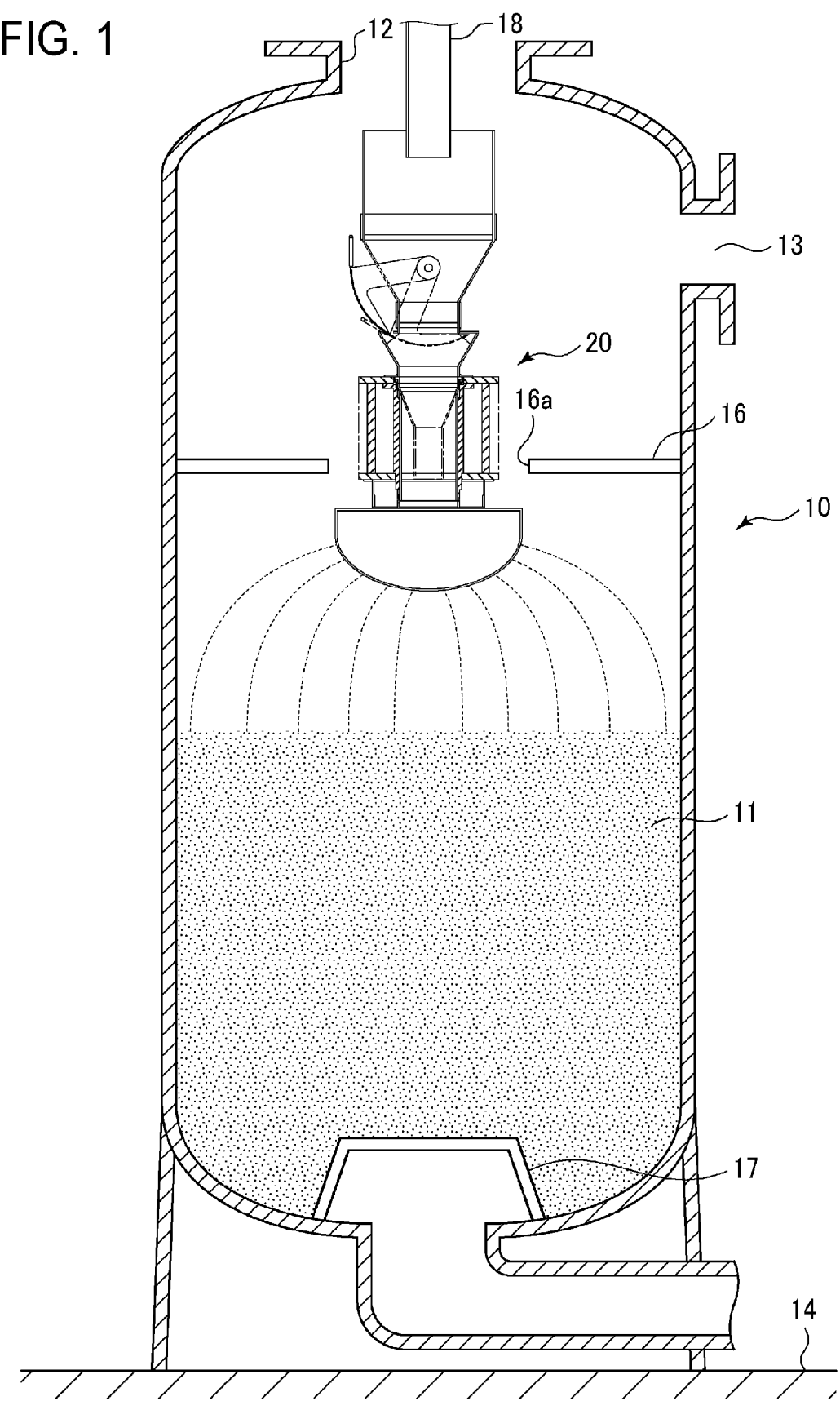
FIG. 1 illustrates the particle packing apparatus according to one embodiment of the present invention installer in a reaction vessel.
Figure 2:
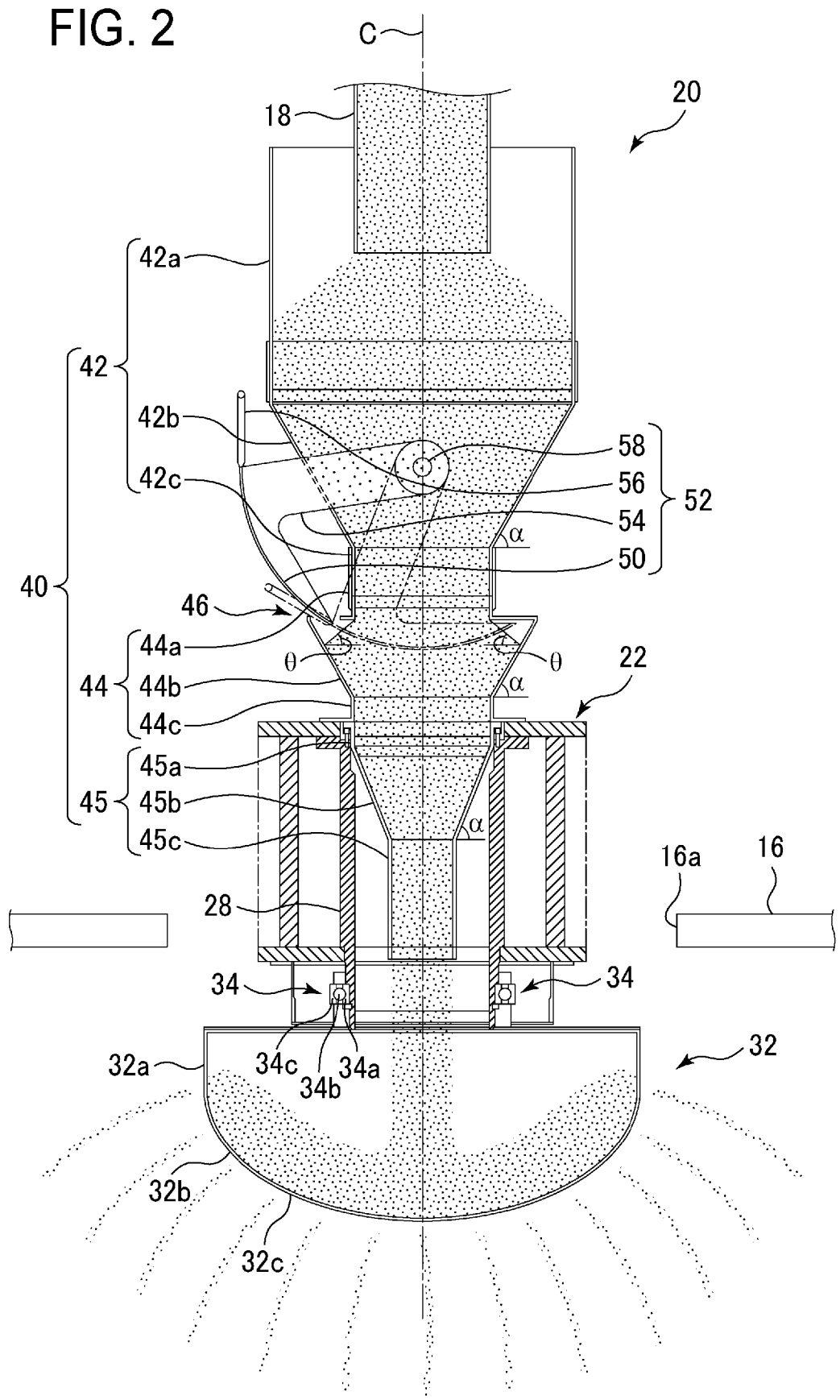
FIG. 2 is a front view of the particle packing apparatus according to the embodiment of the present invention.
Figure 3:
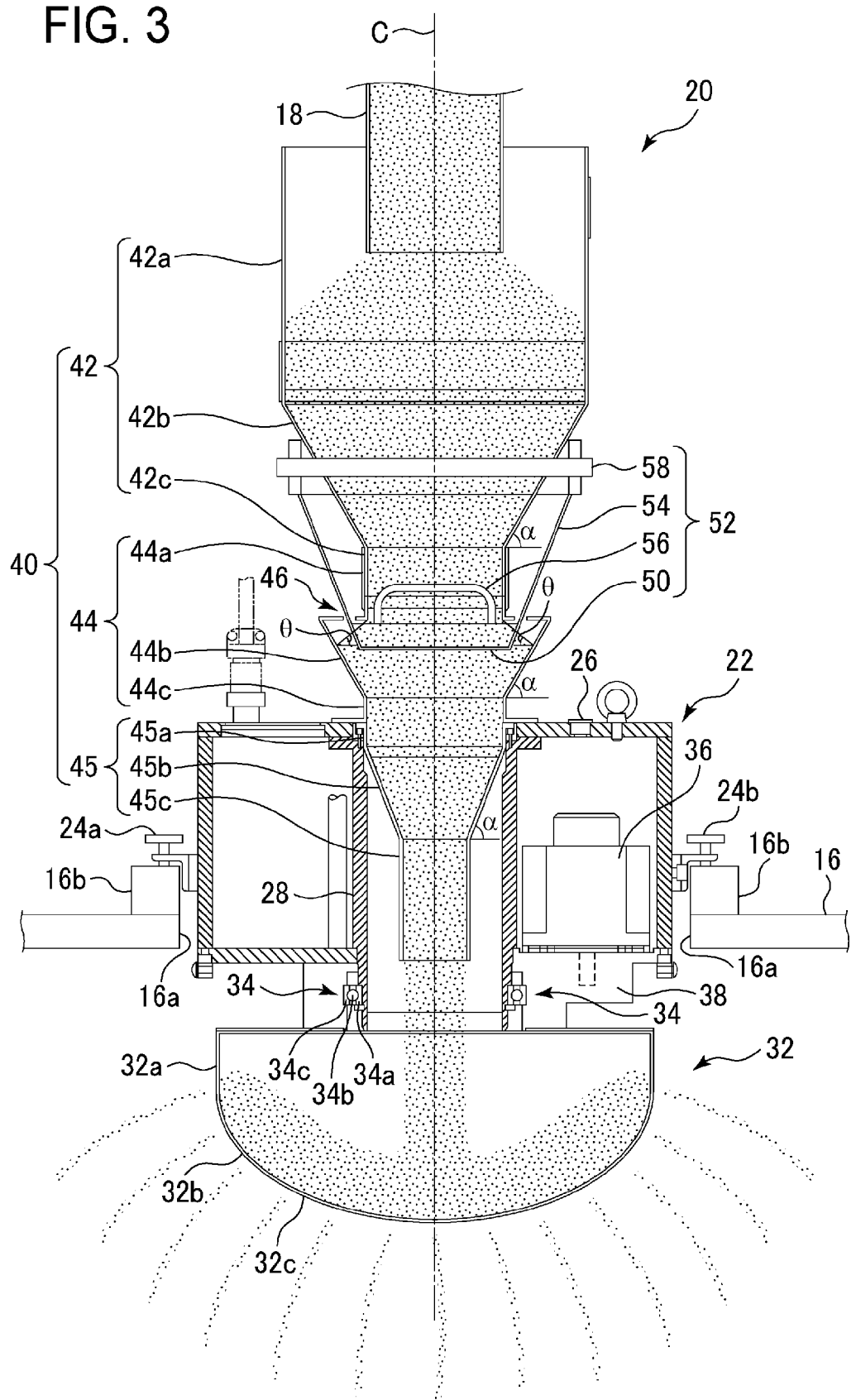
FIG. 3 is a side view of the particle packing apparatus according to the embodiment of the present invention.
Figure 4:
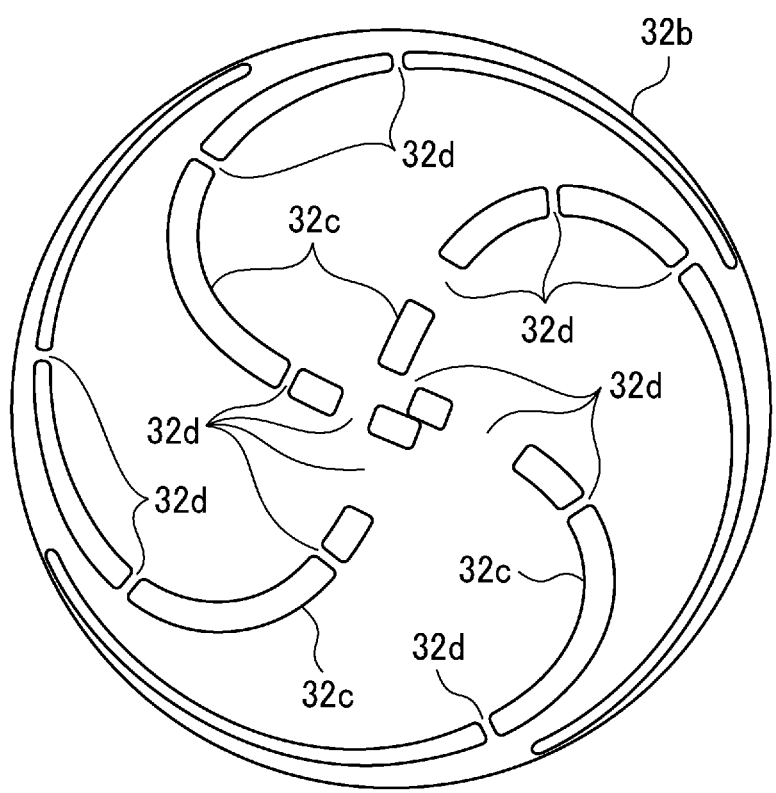
FIG. 4 illustrates the domed portion of the distributor of the particle packing apparatus according to the embodiment of the present invention.

The particle packing apparatus according to one embodiment of the present invention will be described with reference to FIGS. 1 to 5. FIG. 1 is a view illustrating the state of the particle packing apparatus according to the present embodiment installed in a reaction vessel. FIG. 2 is a front view of the particle packing apparatus according to the present embodiment. FIG. 3 is a side view of the particle packing apparatus according to the present embodiment. FIG. 4 is a view of the domed portion of the distributor of the particle packing apparatus according to the present embodiment.

(Reaction Vessel)

As illustrated in FIG. 1, the particle packing apparatus 20 for spraying and packing particles 11 of catalysts, etc. is installed in a vessel which is, e.g., the reaction vessel 10 which is a reaction tower for use in petroleum refining and petrochemical application.

The reaction vessel 10 is a reaction tower in the shape of a bottomed cylinder into which catalysts are to be packed. In the reaction vessel 10 for the reaction operation, a reactant fluid is introduced through the piping in the upper end or in the upper sidewall and is contacted with the catalyst for reaction, and the product fluid is led out after the reaction through the piping in the lower end.

An upper tray 16 for supplying the reactant fluid uniformly on the catalyst layer is formed at an upper portion of the reaction vessel 10. At a lower portion of the reaction vessel 10, a lower tray 17 for preventing the outflow of the catalyst particles out of the catalyst layer. The reaction vessel 10 has the bottom vertically secured by a base 14.

The reactant fluid is supplied to the catalyst layer of the reaction vessel 10 from the upper tray 16, or the reactant fluid is supplied to the catalyst layer of the reaction vessel 10 from the lower tray 17.

During packing the catalyst, the upper pipe of the reaction vessel 10 is removed, and an opening 12 is formed. Through the opening 12, operators enter the inside of the reaction vessel 10, and carry in and installs the particle packing apparatus 20. The particle packing apparatus 20 is set in a setting hole 16a in the upper tray 16 provided inside the reaction vessel 10.

The particles of catalysts, etc. are supplied into the particle packing apparatus through an upper hose 18. The particle packing apparatus 20 sprays the particles of catalysts, etc. inside the reaction vessel 10 uniformly and flat without breaking the particles of catalyst, etc. to pack the particles of catalysts, etc. inside the reaction vessel 10.

In the present embodiment, the particle packing apparatus 20 is installed in the opening 16a formed in the center of the upper tray 16. Unless the opening is formed in the center, the opening may be suitably formed. Unless the upper tray 16 is provided, the particle packing apparatus 20 may be installed in the opening 12.

In the case that the reaction vessel has many trays, the particle packing apparatus 20 is installed sequentially from a lower of the trays to pack the particles.

In the present embodiment, the hose 18, for example, is installed in the opening 12, which is the piping of the upper end of the reaction vessel 10. The hose 18, for example, may be installed in the opening 13 of the piping of the upper sidewall of the reaction vessel 10.

The particles sprayed and packed by the particle packing apparatus according to the present embodiment can be any particle other than particles of catalysts, etc., e.g., grains, minerals, drugs, food, paper, resinous chips, wood chips, metal chips, gravels, sand, concrete rubbles, etc. According to a use, any particle may be sprayed and packed.

The particle packing apparatus according to the present embodiment is effective especially for fragile particles, such as catalysts, adsorbents, etc., e.g., porous particles. For the porous particles, the particle packing apparatus according to the present embodiment is suitable for porous particles of a specific surface area of more than 50 $m^2/g$ including 50 $m^2/g$ to less than 5000 $m^2/g$ (including 5000 $m^2/g$), specifically, more than 150 $m^2/g$ (including 150 $m^2/g$) or less than 1000 $m^2/g$ (including 1000 $m^2/g$).

(Particle Packing Apparatus)

The particle packing apparatus according to the present embodiment will be detailed with reference to FIGS. 2 to 4.

The particle packing apparatus 20 is installed in the upper tray 16 as illustrated in FIG. 3. The particle packing apparatus 20 is set in the opening 16a of the upper tray 16 by an apparatus frame 22.

The apparatus frame 22 is held at a certain position with respect to the upper tray 16 which is a portion of the reaction vessel 10, and functions as the base for securing the respective members of the particle packing apparatus 20.

The apparatus frame 22 is supported by locking fixture 16b formed of an angle, a rectangular pipe or others provided at the edge of the opening 16a of the upper tray 16. Adjusting bolts 24a, 24b, 24c, 24d are provided for adjusting the horizontal posture of the installed particle packing apparatus 20. The adjustment bolts 24a, 24b, 24c, 24d are turned suitably to adjust the height at the 4 points on the upper tray 16 to thereby adjust the posture of the particle packing apparatus.

A level 26 is disposed on the apparatus frame 22. Watching the level 26, an operator turns the adjustment bolts 24a, 24b, 24c, 24d to adjust the apparatus frame 22 to be horizontal. Thereby, the particle packing apparatus 20 is adjusted to be horizontal.

Thereby, the apparatus frame 22 can be installed with the central axis C of a hopper 42, a shutter unit 44 and orifice 45 which will be described later secured vertically to the apparatus frame 22, and can function to adjust the angle of a distributor 32.

The horizontal position of this rotary axis can be adjusted by moving the position of the apparatus frame 22 in the opening 16. In another mode, a horizon adjusting mechanism (not illustrated) which functions to adjust the position of the central axis C may be provided to thereby adjust the position of the central axis C of the particle packing apparatus 20.

A circular cylindrical member 28 is provided in the center of the apparatus frame 22. Both the top and the bottom of the circular cylindrical member 28 are opened.

Outside of the lower portion of the cylindrical member 28, a bearing 34 for installing a distributor 32 rotatable described below. The inner diameter of the bearing 34 is larger than the outer diameter of the cylindrical member 28.

The bearing is, e.g., a ball bearing. The inner ring 34a of the bearing 34 is fixed to the cylindrical member 28, and outer member 34c is fixed to the dish rotation shaft (not illustrated) of the distributor 32. The ball bearing 34b is provided between the inner ring 34a and the outer ring 34c.

The dish rotation shaft (not illustrated) of the distributor 32 and the cylindrical member 28 have a diameter being larger than a diameter of the bottom opening of a particle supplying unit 40 which will be described later. Thereby the particles emitted from the particle supplying unit 40 are supplied in the distributor 32 without colliding with the wall of the cylindrical member 28.

The distributor 32 functions to house distributed particles and to spray the particles from the bottom in accordance with rotations. The distributor 32 has the inside hollow and has the upper cylindrical portion 32a and the lower domed portion 32b which are continuous with each other. The distributor 32 is rotational symmetrical.

The domed portion 32b is a uniaxial rotation elliptical dish. The domed portion 32b has, as illustrated in FIG. 4, four lines of slits 32c formed in the entire surface for spraying the particles outward. The slit 32c of each line is preferably a continuous long hole so that the particles 11 are moved smoothly along the inside surface of the domed portion 32b.

The number of the lines of the slits 32c may be about 2 to 8, and the slits 32c may be openings of a small hole or others as long as the particles can pass.

The 4 lines of slits 32c are spiral in 4 directions from the center of the domed portion 32b. Preferably, all the slits 32c have the same width. Ribs 32d are provided suitably on the respective slits 32 to thereby maintain the shape of the domed portion 32b. Preferably, the ribs 32 are as few and small as possible. The respective slits 32c may have different widths, depending on particles and vessels.

The positions on the each slit 32c where the ribs 32d are formed are so set that when the distributor 32 is rotated, and the particles are sprayed through the slits 32c of the domes portion 32b, the particles are uniformly sprayed. For example, as one contrivance, on the slits 32c adjacent to each other, the ribs 32d are not formed at the positions spaced from the center by the same distance.

On the apparatus frame 22, a motor 36 for rotating the distributor 32 is provided. The torque of the motor 36 is transmitted to the distributor 32 by a transmission mechanism 38. The distributor 32 installed rotatably by the bearing 34 is rotated synchronously with the rotation of the motor 36. The number of the rotation of the motor 36 can be optionally changed.

The motor 36 can be an electric motor, a hydraulic motor, an air motor or others. The transmission mechanism 38 can be a mechanism of belts, gears or others.

Above the apparatus frame 22, a particle supplying unit 40 for supplying particles to be sprayed is provided. The particles of catalyst, etc. supplied from the upper hose 18 are supplied to the distributor 32 by the particle supplying unit 40.

The particle supplying unit 40 includes a hopper 42 which receives the particles supplied from the upper hose 18, a shutter unit 44 which shutters and resumes the supply of the particles and an orifice 45 which adjust the supply of the particles to the distributor 32. The shutter unit 44 has a discontinuous portion 46 which is not defined by the side wall to dispose the particles being supplied visibly from the outside. In the discontinuous portion 46, a shutter plate which will be described later is inserted.

The hopper 42 generally has a cone-shape, the so-called funnel shape, having the top opening of a diameter being larger than a diameter of the bottom opening. The hopper 42 includes an upper guide cylinder 42a in the cylindrical shape of a certain diameter, a cone shape portion 42b having the top opening having a diameter being larger than a diameter of the bottom opening, and a lower guide cylinder 42c in a cylindrical shape of a fixed diameter. The diameter of the top opening of the cone-shaped portion 42b is the same as the diameter of the upper guide cylinder 42a, and the diameter of the bottom opening of the cone-shaped portion 42b is the same as the diameter of the lower guide cylinder 42c.

The lower portion of the shutter unit 44 has a cone-shape, the so-called funnel-shape having the top opening having a diameter being larger than a diameter of the bottom opening. The shutter unit 42 includes an upper guide cylinder 44a which supports the lower guide cylinder 42c of the hopper 42, a cone-shaped portion 44b which is continuous to the upper guide cylinder 44a and has the top opening having a diameter being larger than a diameter of the bottom opening, and a lower guide cylinder 44c of a certain diameter.

The orifice 45 has a cone-shape, a so-called funnel-shape having the top opening having a diameter being larger than a diameter of the bottom opening. The orifice 45 includes an upper guide cylinder 45a in the shape of a cylinder of a certain diameter, a cone-shaped portion 45b having the top opening having a diameter being larger than a diameter of the bottom opening, and a lower guide cylinder 45c in the shape of a cylinder of a certain diameter.

The orifice 45 is replaced to thereby adjust the supply rate and supply quantity of the particle to the distributor 32.

In the particle supplying unit 40, the inclination angle $\alpha$ of the cone-shaped portion 42b of the hopper 42, the cone-shaped portion 44b of the shutter unit 44 and cone-shaped portion 45b of the orifice 45 which have the decreasing opening diameters are made larger than a repose angle θ of particles to be packed, whereby the particles are prevented from being broken in the particle supplying unit 40.

The relationship between the inclination angles α of the cone-shaped portions 42b, 44b, 45b and the repose angle θ will be described with reference to FIG. 5.

The repose angle θ of particles are defined to be an angle of an inclined surface at which when the particles are piled on a plate, the particles remain stable by themselves without collapsing. Based on the repose angle θ of particles, the inclination angle α of the sidewalls can be designed. The repose angle θ is substantially equal to an inclination angle which keeps the particles packed in the cone-shape, the so-called funnel-shape having the top opening sufficiently larger than the bottom opening stable without collapsing by themselves when the particles are emitted out of the bottom opening.

Figure 5A:
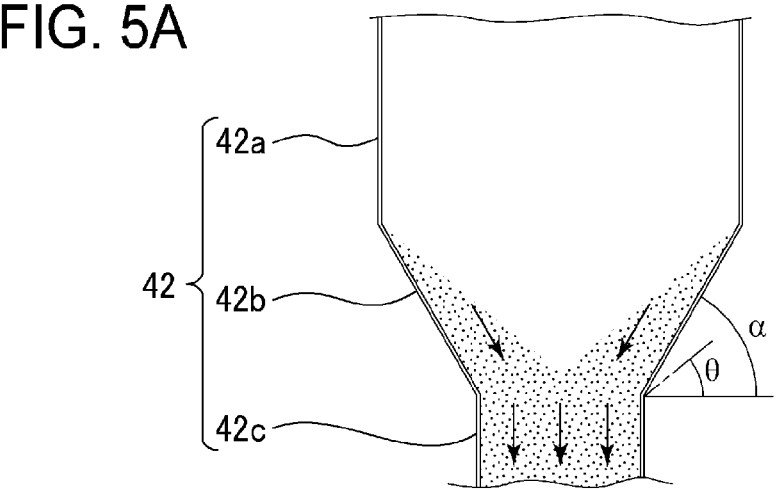
FIGS. 5A to 5C are views explaining the particle supplying unit of the particle packing apparatus according to the embodiment of the present invention.

As illustrated in FIG. 5A, in supplying particles by the hopper 42, the angle α of the sidewall of the cone-shaped portion 42 is made larger than the repose angle θ of the particles, whereby the particles are prevented from residing, and rubbing each other and breaking.

Figure 5B:
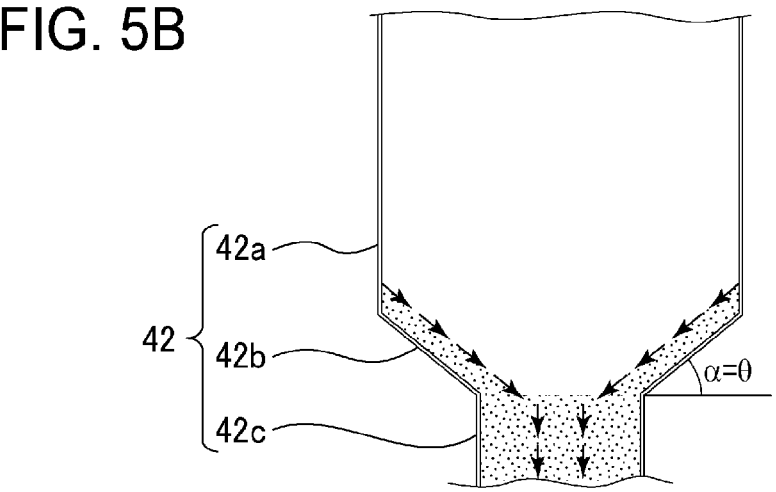
Figure 5C:
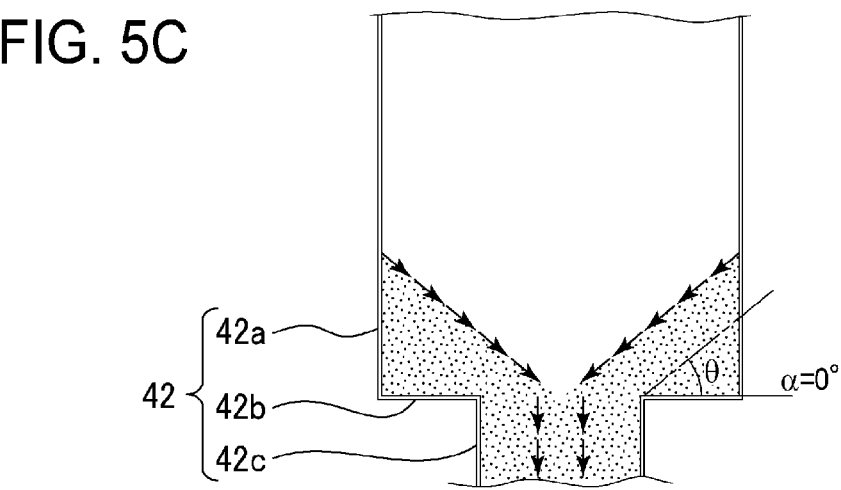

As illustrated in FIG. 5C, when the angle α of the sidewall of the cone-shaped portion 42b of the hopper 42 is smaller than the repose angle θ, e.g., 0°, the particles reside and pile, forming the repose angle θ, and the particles sliding down from near the surface of the piled particles rub one another and break.

As illustrated in FIG. 5B, when the angle α of the sidewall of the cone-shaped portion 42b of the hopper 42 is equal to the repose angle θ, the particles do not substantially reside and do not substantially rub one another and break.

As described above, the inclination angle α of the sidewalls of the cone-shaped portions 42b, 44b, 45b are made larger than the repose angle θ of particles to be packed, whereby the particles are prevented from breaking.

This repose angle is determined by sizes of particles, and excessive roundness and configurations of the particles. For example, the repose angle of the particle as a catalyst having a four-leaf columnar section is about 40°.

The particle packing apparatus according to the present embodiment can spray and pack particles other than catalysts, e.g., grains, minerals, drugs, food, paper, resinous chips, wood chips, metal chips, gravels, sand, concrete rubbles, etc. These particles have respective intrinsic repose angles.

In the discontinuous portion 46 of the shutter unit the particles being packed are exposed, and the opening angle of the cone-shaped portion 44b of the shutter unit 44 is so determined that at the exposed portion, the particles are piled, forming the repose angle θ.

The cone-shaped portion 44b of the shutter unit 44 has an aperture at the top being larger than an aperture at the bottom of the hopper 42, whereby no particle overflows the discontinuous portion 46 of the shutter unit 44.

When the packing of the particles is stopped, a shutter plate 50 is inserted into the discontinuous portion 46 of the shutter unit 44.

The particle packing apparatus according to the present embodiment is characterized in that, as illustrated in FIGS. 2 and 3, the hopper 42, the shutter unit 44 and the orifice 45 are lineally arranged with the common central axis C at the center, and the hopper 42, the shutter 44, the orifice 45 and the distributor 32 are rotational symmetrical with respect to the central axis C.

Consequently, the particles supplied from the hose are packed in the distributor 32 without colliding obstacles, bends in the particle packing path, etc. and breaking. The particles are packed at the center of the distributor 32 and uniformly distributed in the reaction vessel 10 from the slit 32c of the distributor 32.

(Shutter Mechanism)

Next, with reference to FIGS. 2 and 3, a shutter mechanism 52 which stops/resumes the packing of particles with the shutter plate 50 will be described.

In FIG. 2, the state in which the shutter plate 50 of the shutter mechanism 52 is opened, i.e., the packing is not intercepted is illustrated by the solid line, and the state in which the shutter plate 50 of the shutter mechanism 52 is closed, i.e., the packing of particles is intercepted by the shutter plate 52 is illustrated by the virtual line.

In FIG. 3, the state in which the shutter plate 50 of the shutter mechanism 52 is closed, i.e., the packing of particles is intercepted by the shutter plate 50 is illustrated by the solid line. In FIG. 3, the state in which the shutter plate 50 of the shutter mechanism 52 is opened, i.e., the packing of particles is not intercepted by the shutter plate 50 is not illustrated.

A support arm 54 and a handle 56 are provided on the shutter plate 50. The support arm 54 is so provided that the shutter plate 50 can rotate around a shutter rotation shaft 58. The shutter plate 50, the support arm 54, the handle 56 and the shutter rotation shaft 58 form the shutter mechanism 52.

An operator operates the shutter plate 50 by holding the handle 56.

When the packing of particles is stopped, the shutter plate 50 is pushed down with the handle 56 to be inserted into the packed particle mass. At this time, the particles mass is piled so as to form the repose angle, whereby the particles never overflow from the discontinuous portion 46.

The clearance of the discontinuous portion 46 has such a sufficient length in comparison with a size of particles, whereby the particles are never broken by the shutter plate 50 inserted. The clearance of the discontinuous portion 46 can be set more than twice including twice a size of particles, especially can be set more than 10 times including 10 times. The clearance is preferably less than 20 times including 20 times a size of particles.

When the packing of the particles is resumed, the shutter plate 50 is pulled up with the handle 56. At this time, the particle mass piled on the shutter plate 50 falls downward into the lower cone-shaped portion 44b of the shutter portion 44. and the particles never overflow the discontinuous portion 46.

(Particle Supplying Stopping and Resuming Operations)

With reference to FIGS. 6 and 7, the operation of stopping/resuming the supplying of particles with the shutter mechanism 52 will be described.

Figure 6A:
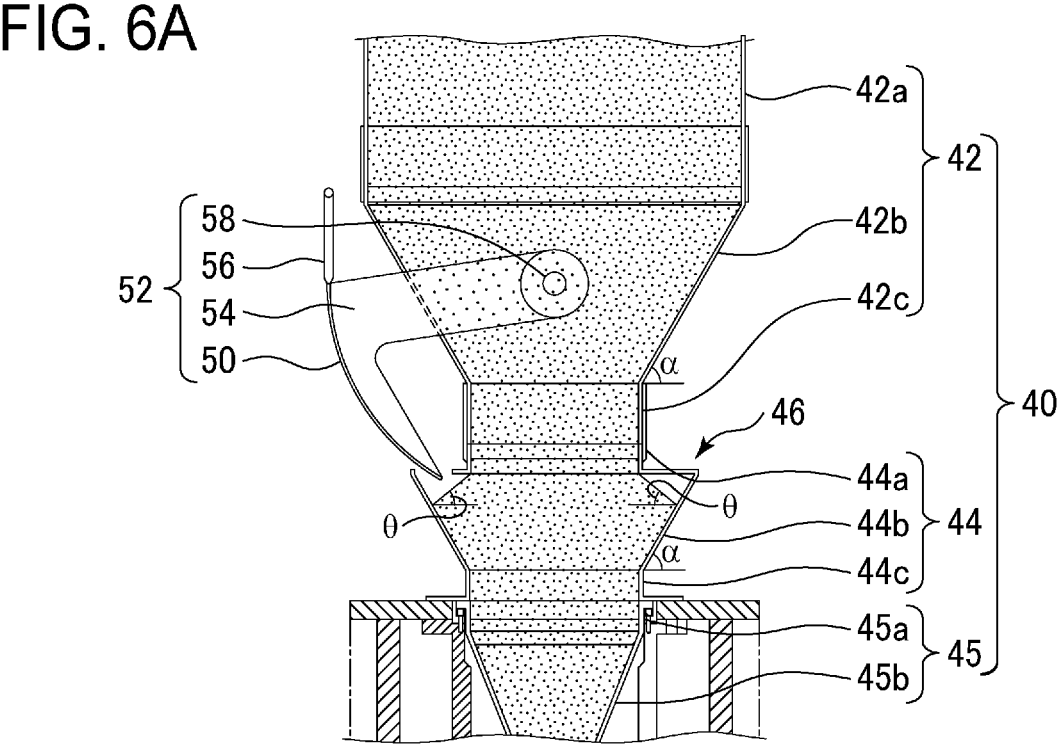
FIGS. 6A and 6B are views explaining the operation of the shutter mechanism of the particle packing apparatus according to the embodiment of the present invention (Part 1).

First, in the state where particles are being packed, as illustrated in FIG. 6A, the particles are stuffed from the hopper 42 to the shutter unit 44 with the particles piled on the inclined surface of the cone-shaped portion 44b of the shutter 44. The angle of the surface of the piled particles is the repose angle θ, which retains the particles stable without causing the particles by themselves. At the discontinuous portion 46 of the shutter unit 44, the particles being packed are exposed.

Figure 6B:
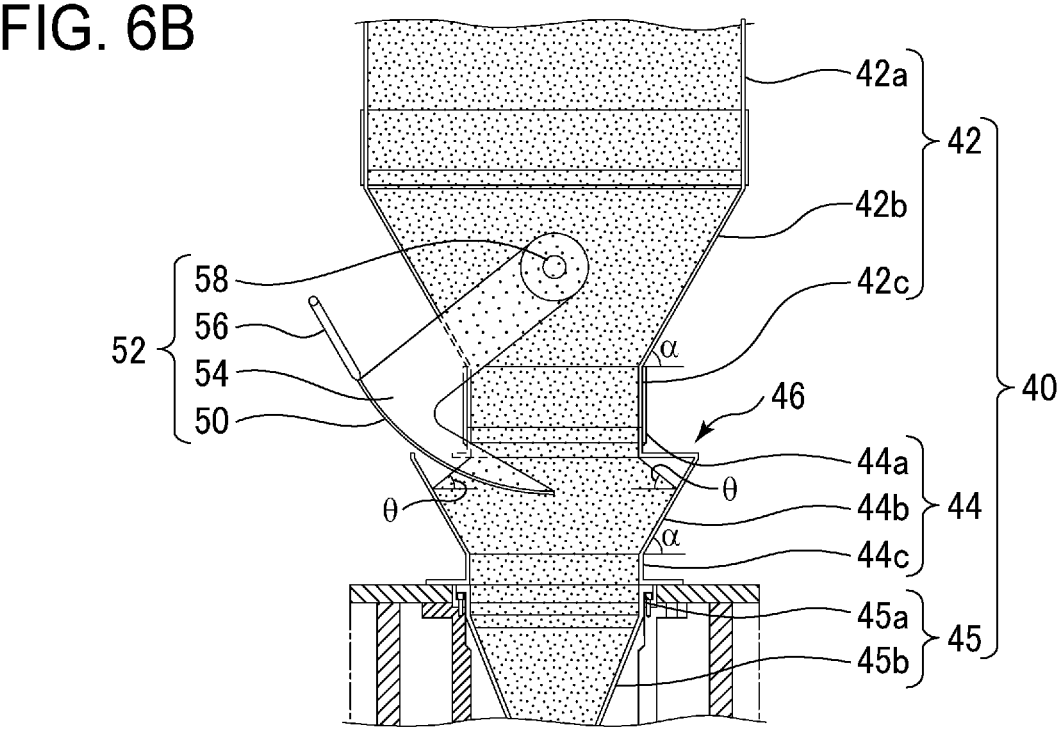

When the packing is stopped, an operator pushes downward the shutter plate 50 with the handle 56. As illustrated in FIG. 6B, the shutter plate 50 is inserted into the particle mass through the discontinuous portion 46. The particles mass is piled so as to form the repose angle θ, whereby the particles never overflow from the discontinuous portion 46.

Figure 7A:
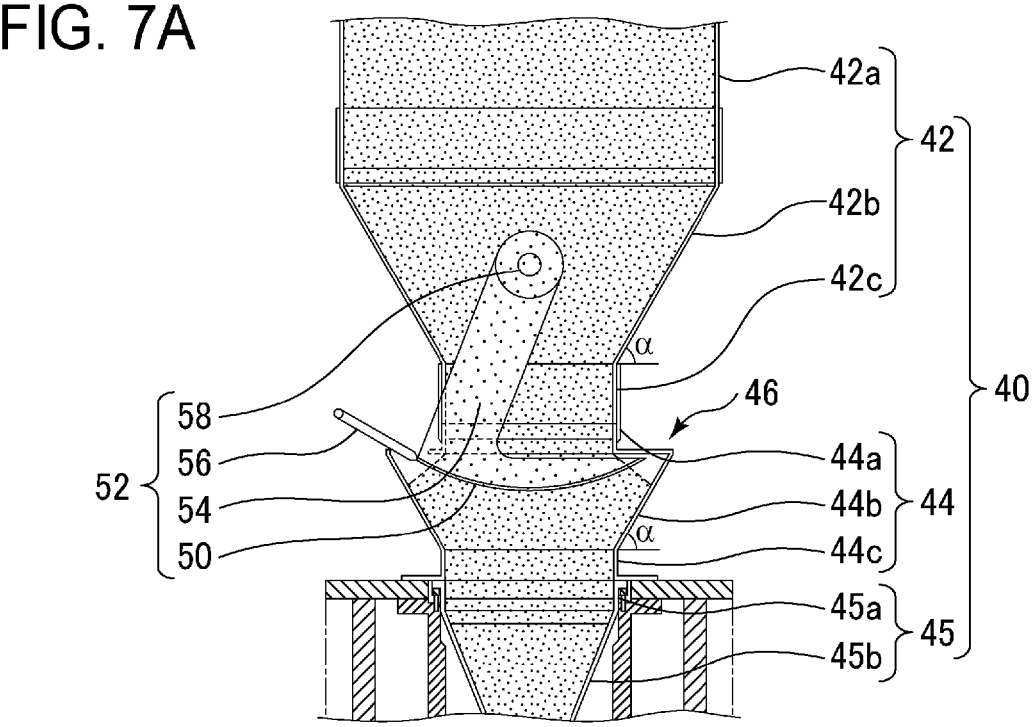
FIGS. 7A and 7B are views explaining the operation of the shutter mechanism of the particle packing apparatus according to the embodiment of the present invention (Part 2).

When the shutter plate 50 is further pushed down, as illustrated in FIG. 7A, the packing path of the particles is completely shut with the shutter plate 50. When the forward end of the shutter plate 50 is protruded, particles of the particle mass piled forming the repose angle θ never overflow the discontinuous portion 46.

Figure 7B:
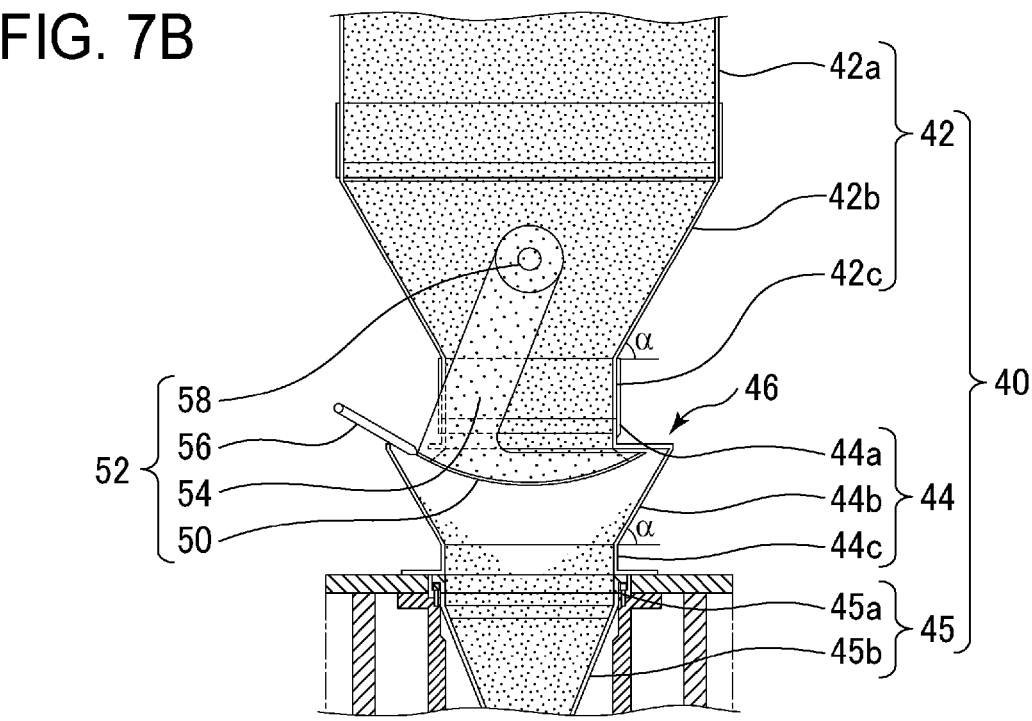

Then, when the particles are sprayed from the distributor 32 into the reaction vessel 10, as illustrated in FIG. 7B, the surface of the particle below the shutter plate 50 lowers, and a cavity is formed. At this time, because of the angle α of the sidewall of the cone-shaped portion 44b of the shutter unit 44 which is larger than the repose angle θ, the particles do not reside and never rub one another and break.

When the packing of the particles is resumed, the operator slowly pulls the shutter plate 50 upward with the handle 56. The shutter plate 50 shifts from the state of FIG. 6B to the state of FIG. 6A. At this time as well, the particle mass piled on the shutter plate 50 calmly into the lower shutter unit 44 below, and the particles never overflow the discontinuous portion 46.

As described above, in the particle packing apparatus according to the present embodiment, the operation of stopping/resuming the packing of particles can be made by the shutter mechanism without the particles overflowing outside.

In the particle packing apparatus according to the present embodiment, the position and the size of the shutter plate 50 are so set so that the shutter plate extends wider than the extent from the bottom end of the hopper 42 to the cone-shaped portion 42b, where particles spread at a repose angle θ, whereby even with the shutter plate 50 closed, the particles never overflow the discontinuous portion 46.

(Modifications of the Shutter Mechanism)

Next, a modification of the shutter mechanism for stopping/resuming the packing of particles with the shutter plate will be described with reference to FIG. 8.

The shutter mechanism 60 according to the present modification is characterized in that no obstacle, such as the shutter rotation shaft 58, is provided in the packing path of particles.

In FIG. 8, the state where the shutter plate 62 of the shutter mechanism 60 is closed, i.e., the supplying of particles is shut with the shutter plate 62 is illustrated by the solid line, and the state where the shutter plate 62 of the shutter mechanism 60 is opened, i.e., the supplying of the particles is not shut with the shutter plate 62 is illustrated by the virtual line.

Figure 8A:
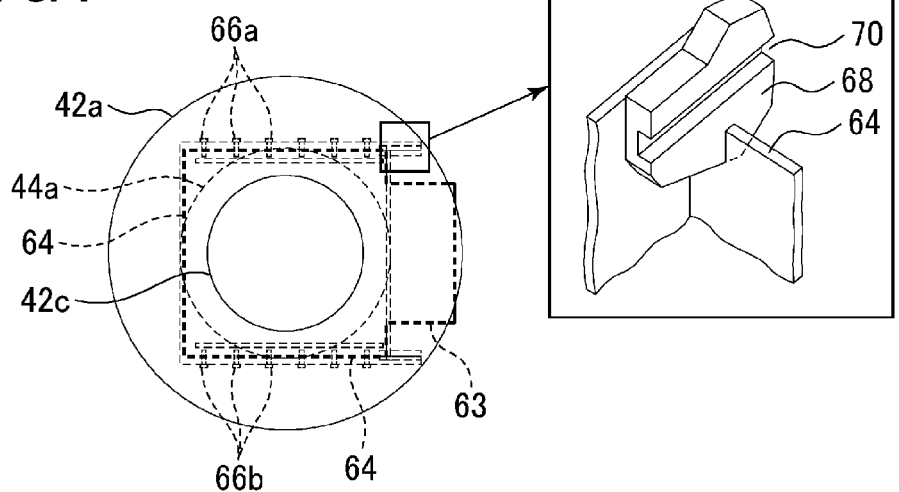
FIGS. 8A and 8B are views illustrating a modification of the shutter mechanism of the particle packing apparatus according to the embodiment of the present invention.
Figure 8B:
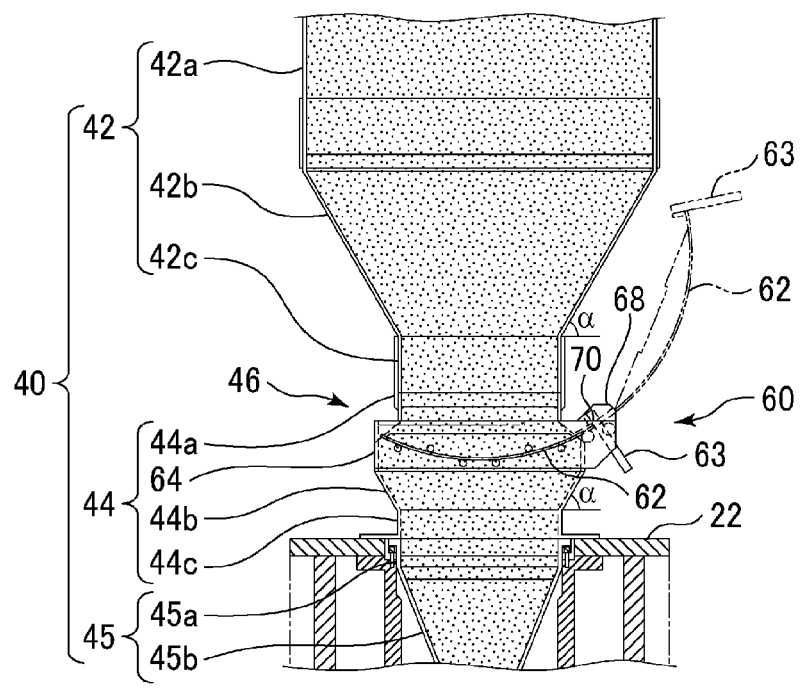

As illustrated in FIG. 8B, a rectangular shutter plate housing portion 64 is provided on the top of the so-called funnel-shaped cone-shaped portion 44b of the shutter unit 44. The shutter plate housing portion 64 is connected to an upper guide cylinder 44a.

As illustrated in FIG. 8A, the shutter plate housing portion 64 has a plurality of guide rods 66a, 66b respectively provided on the left wall and the right wall as viewed in the direction where the shutter plate 62 is inserted. The guide rods 66a, 66b are projected inward from the shutter plate housing portion 64 along the line of inserting the shutter plate 62. The plural guide rods 66a, 66b are provided alternately upward and downward along the path of inserting the shutter plate 62 so as to support the inserted shutter plate 62. The guide rods 66a, 66b are spaced wide from each other and form round bars so that particles are not piled on the guide rods 66a, 66b.

A handle 63 is provided on the shutter plate 62. An operator holds the handle 63 to operate the shutter.

On the right side of the shutter plate housing portion 64 as viewed in FIG. 8B, an insertion opening 68 for the shutter plate 62 is provided. In the insertion opening 68, a guide 70 for guiding the direction of inserting the shutter plate 62 is provided.

As illustrated in FIG. 8A, the guide 70 of a groove-shape of a certain length is formed in the insertion opening 68 left-to-right as viewed in the direction of inserting the shutter plate 62 of the shutter plate housing portion 64. The guide 70 defines the insertion direction of the shutter 62.

When the shutter plate 62 is inserted into the shutter plate housing portion 64, with the handle 63, an operator inserts the shutter plate 62 through the inserting opening 68, the insertion direction is defined by the guide 70, guided along the insertion direction by the plural guide rods 66a, 66b and is housed in the shutter plate housing portion 64.

When the shutter plate 62 is drawn out of the shutter plate housing portion 64, the operator draws out the shutter plate 62 with the handle 63 from the right side as viewed in FIG. 8B. The shutter plate 62 is guided by the plural guide rods 66a, 66b and smoothly drawn out of the insertion opening 68.

The shutter 62 drawn out is placed near the particle packing apparatus with, e.g., a wire (not illustrated).

As described above, in the shutter mechanism 60 according to the present modification, no component which is an obstacle is present in the path of packing particles, whereby the particle supplying can be smooth.

Modified Embodiments

The present invention is not limited to the above-described embodiment and can cover other various modifications.

In the above-described embodiment, catalysts are packed in the reaction vessel as the vessel. However, the present invention is applicable to a case that an adsorbent is packed into an adsorbent tower. The present invention is applicable to a case that the vessel is a storage silo, and particles are packed in the storage silo.

In the above-described embodiment, the reaction vessel is a bottomed cylindrical reaction tower for catalyst to be packed in. The reaction vessel may be a multi-pipe reaction vessel having many pipes and a multistage reaction vessel having a plurality of stages.

REFERENCE NUMBERS 10 reaction vessel
11 particles
12 opening
13 opening
14 base
16 upper tray
16a opening
16b fixture
17 lower tray
18 hose
20 particle packing apparatus
22 apparatus frame
24a, 24b, 24c, 24d adjustment bolts
26 level 28 cylindrical member
32 distributor
32a cylindrical portion
32b domed portion
32c slit
32d rib
34 bearing
34a inner ring
34b ball bearing
34c outer ring
36 motor
38 transmission mechanism
40 particle supplying unit
42 hopper
42a upper guide cylinder
42b cone-shaped potion
42c lower guide cylinder
44 shutter unit
44a upper guide cylinder
44b cone-shaped portion
44c lower guide cylinder
45 orifice
45a upper guide cylinder
45b cone-shaped portion
45c lower guide cylinder
46 discontinuous portion
50 shutter plate
52 shutter mechanism
54 support arm
56 handle
60 shutter mechanism
62 shutter plate
63 handle
64 shutter plate housing portion
66a, 66b guide rods
68 insertion opening
70 guide

What is claimed is:

1. A particle packing apparatus for packing particles into a vessel, comprising:
   a base held at a fixed position with respect to the vessel;
   a distributor which is rotational symmetrical to a central axis extended vertically and distributes the particles;
   a bearing fixed to the base and holding the distributor rotatably;
   a particle supplying unit fixed to the base, being rotational symmetrical to the central axis, having a bottom opening being smaller than an inner diameter of the bearing and supplying the particles to the distributor through the bottom opening; and
   a motor rotating the distributor.

2. A particle packing apparatus according to claim 1, wherein
   the distributor includes:
   a uniaxial rotation elliptical dish having slits formed in for emitting the particles; and
   a dish rotation shaft connecting the dish to a rotation shaft of the bearing and having a configuration which prevents contacting the particles packed to the dish from the particle supplying unit.

3. A particle packing apparatus according to claim 2, wherein
   the bottom opening of the particle supplying unit is smaller than an inner diameter of the dish rotation shaft,
   a top opening of the particle supplying unit is larger than the bottom opening, and
   the inclination of the sidewall between the top opening and the bottom opening of the particle supplying unit is larger than a repose angle of the particles.

4. A particle packing apparatus according to claim 1, further comprising
   a shutter mechanism for shutting the supplying of the particles in the middle of the particle supplying unit,
   the shutter mechanism including:
   a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and
   a shutter plate to be inserted into the discontinuous portion, the shutter plate opening and closing a supplying path of the particles.

5. A particle packing apparatus according to claim 1, further comprising:
   an adjusting mechanism provided on the base for adjusting a position and/or an angle of the central axis.

6. A particle packing apparatus according to claim 1, wherein the particle supplying unit is vertically extended, the particle supplying unit has a top opening provided in the top and a shutter mechanism provided in the middle for shutting the supplying of the particles,
   the shutter mechanism including:
   a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and
   a shutter plate to be inserted into the discontinuous portion, the shutter plate opening and closing a supplying path of the particles.

7. A particle packing apparatus according to claim 6, wherein
   the shutter plate in a closing state covers an extent where the particles spread at a repose angle of the particles from the top of the discontinuous portion.

8. A particle packing apparatus according to claim 2, further comprising:
   an adjusting mechanism provided on the base for adjusting a position and/or an angle of the central axis.

9. A particle packing apparatus according to claim 3, further comprising:
   an adjusting mechanism provided on the base for adjusting a position and/or an angle of the central axis.

10. A particle packing apparatus according to claim 4, further comprising:
    an adjusting mechanism provided on the base for adjusting a position and/or an angle of the central axis.

11. A particle packing apparatus according to claim 2, wherein
    the particle supplying unit is vertically extended, the particle supplying unit has a top opening provided in the top and a shutter mechanism provided in the middle for shutting the supplying of the particles,
    the shutter mechanism including:
    a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

12. A particle packing apparatus according to claim 3, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

13. A particle packing apparatus according to claim 4, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

14. A particle packing apparatus according to claim 5, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

15. A particle packing apparatus according to claim 7, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

16. A particle packing apparatus according to claim 8, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

17. A particle packing apparatus according to claim 9, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

18. A particle packing apparatus according to claim 10, wherein the particle supplying unit is vertically extended, the particle supplying unit has a top opening provided in the top and a shutter mechanism provided in the middle for shutting the supplying of the particles, the shutter mechanism including:

a discontinuous portion formed in the middle of the particle supplying unit, a diameter of an opening of the particle supplying unit at the bottom of the discontinuous portion being larger than a diameter of an opening of the particle supplying unit at the top of the discontinuous portion; and a shutter plate to be inserted into the discontinuous portion, the shutter plate opening and closing a supplying path of the particles.

\* \* \* \* \*